June 6, 1961  F. S. ALLINQUANT  2,987,146
SHOCK ABSORBER PISTON
Filed March 12, 1959
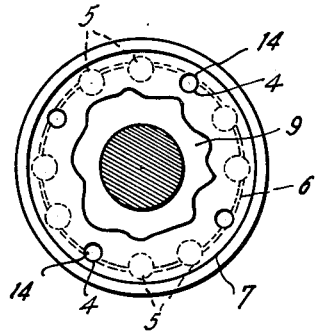
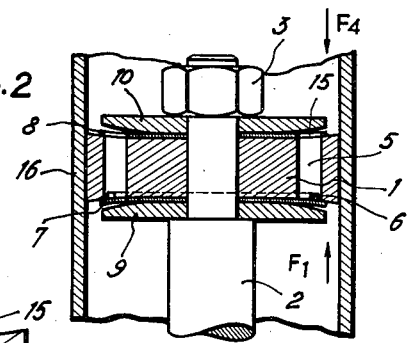
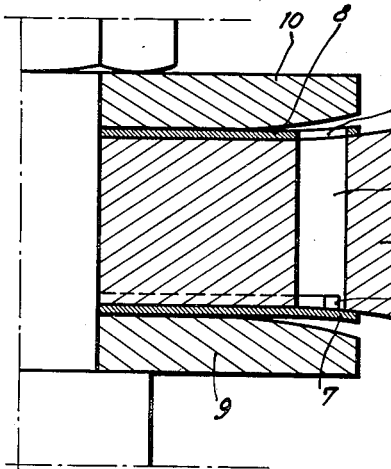
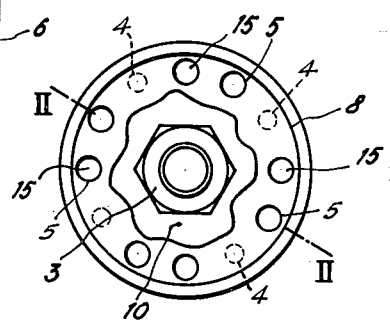
Inventor:
Fernand Stanislas Allinquant
by Robert Henderson
attorney

2,987,146
SHOCK ABSORBER PISTON
Fernand Stanislas Allinquant, 53 Avenue Le Notre, Sceaux, France
Filed Mar. 12, 1959, Ser. No. 799,042
Claims priority, application France Mar. 15, 1958
2 Claims. (Cl. 188—96)

This invention relates generally to fluid shock absorbers and refers more particularly to pistons for use in telescopic shock absorbers.

U.S. patent specification No. 2,316,924 of Apr. 20, 1943, describes and illustrates a hydraulic shock absorber having a piston of the type which is perforated with ducts divided into two groups and which comprises at each of its faces a valve formed by a flexible metal disc or foil controlling the orifices of one of the duct groups so that one of these groups is used for the decantation of the oil or other shock-absorbing fluid from one face of the piston to the other when the said piston moves in one direction, whereas the other group effects this decantation when the piston moves in the opposite direction.

The object of the invention is to provide an improved shock absorber piston of the type referred to above, which is simple and economical to manufacture and which has excellent oscillation retarding properties.

According to the invention there is provided a shock absorber piston perforated with ducts divided into two groups and comprising at each of its faces a valve formed of a flexible metal disc or foil controlling the orifices of one of the groups of ducts, so that one group of ducts is used for the decantation of the oil or other fluid in one direction and the other group for the decantation of the oil or other fluid in the other direction, characterised in that the said ducts are distributed in a ring-shaped formation in the piston with their axes arranged parallel to one another, and at each of the piston faces the ducts of one group open through orifices formed in the flexible disc or foil which controls the outlets of the ducts of the other group.

In this way there is obtained a construction of piston which is both simple and symmetrical and also permits providing, at each side of the piston, washers with convex faces for limiting the deformation of the foils when they are opened by the oil pressure, these symmetrically positioned washers constituting a further feature of the invention.

This symmetrical construction of the piston does not exclude the possibility of obtaining different flows through the piston in the two directions of displacement of the said piston. It is sufficient to use different numbers of ducts in the two groups or to give the ducts of the two groups different diameters from one another, or to combine both these methods.

One constructional form of a piston according to the invention and mounted within the cylinder of a shock-absorber will now be described by way of example with reference to the accompanying drawings, in which:

FIG. 1 is a plan view of the piston, the plan view being taken in the direction indicated by the arrow $F_1$ in FIG. 2 and showing the outer parts of a washer 9 broken away, FIG. 2 is an axial sectional view of the piston and cylinder, the axial view being taken along line II—II in FIG. 4, FIG. 3 is a view of part of the piston on a larger scale, showing details of construction, FIG. 4 is a plan view of the piston, this plan view being taken in the direction indicated by the arrow $F_4$ in FIG. 2 and showing the outer parts of a washer 10 broken away.

As shown in the drawings, the piston comprises a body 1 which is perforated with a ring of ducts 4, 5 extending axially through the body 1 and interconnected by a circular groove 6 on the lower face of the body 1.

A valve 7 in the form of a flexible metal disc or thin foil having apertures 14 registering with the ducts 4 is mounted on the lower face of the body 1 by a washer 9 having a convex upper face. The apertures 14 are preferably of slightly larger diameter than the diameter of the ducts 4.

Similarly, a valve 8 in the form of a flexible metal disc or thin foil having apertures 15 registering with the ducts 5 is mounted on the upper surface of the body 1 by a washer 10 having a convex lower face.

The assembly of the piston body 1, valves 7, 8 and washers 9, 10 is mounted on a reduced diameter end portion of a piston rod 2 and is movable in a cylinder 16 filled with oil, the assembly being provided with a central aperture for the reception of the reduced diameter end of the rod 2 and being located against the shoulder on the rod 2 by a nut 3 screwed on to the reduced diameter end of the rod 2.

The method of operation is as follows:

When the piston is displaced in the direction of the arrow $F_1$ within its working cylinder 16, which is filled with oil, the oil passes from the upper to the lower side of the piston through the apertures 15 and ducts 5 and then around the periphery of the valve 7, which is forced downwards away from the lower face of the body 1 by the pressure of the oil. The distribution of the oil pressure around the valve 7 is facilitated by the presence of the groove 6, which also ensures easy free passage through the apertures 14.

When the piston is displaced in the direction of the arrow $F_4$, the oil passes from the lower to the upper side of the piston through the apertures 14 and ducts 4 around the periphery of the valve 8, which is forced upwards away from the upper face of the body 1 by the pressure of the oil.

The convex faces of the two washers 9 and 10 limit the deformation of the foils when they open, and thereby prevent the foils from being permanently deformed.

It will be apparent that the resistance afforded to the passage of the oil varies in accordance with the number and size of the ducts, the presence of the groove 6, and the thickness of the discs constituting the valves.

The distribution of the holes indicated in the drawings (FIGS. 1 and 4), namely four ducts 4 and apertures 14 in one direction and eight ducts 5 and apertures 15 in the other direction, is generally satisfactory in obtaining the usual shock-absorbing conditions.

Of course, each valve 7 and 8 may comprise a stack of a plurality of foils instead of a single foil as shown in the drawings.

It is also possible, more particularly with a view to facilitating the construction of the body 1, to make the ducts 4 and 5 other than cylindrical in shape; more particularly, they may be conical so as to permit the piston to be formed by casting, or they may have stepped diameters.

I claim:

1. A shock absorber having a pressure cylinder and a piston slidably engaged therein and formed with a series of parallel ducts extending through the piston in ring-shaped formation and opening at the end faces of the piston, two flexible metal valve members mounted one against each of the end faces of the piston and having a circular shape with a continuous circumferential rim portion, and parts through said members, the ports of one of said valve members being in register with only some of said ducts while the ports of the other of said valve members are in register with only the remaining ducts.

2. The combination of claim 1, wherein the peripheries of said two valve members have equal radii and the ports through said valve members are arranged on circles having radii which are equal.

References Cited in the file of this patent

UNITED STATES PATENTS

| | | |
|---|---|---|
| 2,676,676 | Strauss et al. | Apr. 27, 1954 |
| 2,748,898 | Carbon | June 5, 1956 |
| 2,811,226 | Allinquant | Oct. 29, 1957 |

FOREIGN PATENTS

| | | |
|---|---|---|
| 1,080,670 | France | Apr. 16, 1953 |
| 775,221 | Great Britain | May 22, 1957 |

UNITED STATES PATENT OFFICE
CERTIFICATE OF CORRECTION

Patent No. 2,987,146 June 6, 1961

Fernand Stanislas Allinquant

It is hereby certified that error appears in the above numbered patent requiring correction and that the said Letters Patent should read as corrected below.

Column 3, line 13, for "parts" read -- ports --.

Signed and sealed this 24th day of October 1961.

(SEAL)
Attest:

ERNEST W. SWIDER
Attesting Officer

DAVID L. LADD
Commissioner of Patents
USCOMM-DC